United States Patent
MacLaurin et al.

(10) Patent No.: US 8,015,141 B2
(45) Date of Patent: Sep. 6, 2011

(54) RULE-BASED PROGRAMMING LANGUAGES FOR ENTITIES IN ENVIRONMENTS

(75) Inventors: Matthew MacLaurin, Bellevue, WA (US); Michael C. Miller, Sammamish, WA (US); Stephen B. Coy, Bellevue, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 12/032,702

(22) Filed: Feb. 18, 2008

(65) Prior Publication Data

US 2009/0210372 A1 Aug. 20, 2009

(51) Int. Cl.
*G06N 5/02* (2006.01)

(52) U.S. Cl. .......................................... 706/47; 717/114

(58) Field of Classification Search .................... 706/47, 706/62; 717/114
See application file for complete search history.

(56) References Cited

U.S. PATENT DOCUMENTS

| | | | |
|---|---|---|---|
| 5,517,663 A | 5/1996 | Kahn | |
| 5,659,793 A | 8/1997 | Escobar et al. | |
| 5,859,637 A | 1/1999 | Tidwell, II | |
| 5,862,379 A | 1/1999 | Rubin et al. | |
| 6,600,502 B1 | 7/2003 | Brewster, Jr. | |
| 6,944,825 B2 | 9/2005 | Coco et al. | |
| 2004/0162141 A1 | 8/2004 | Stienstra | |

OTHER PUBLICATIONS

Stolee et al ("Expressing Computer Science Concepts Through Kodu Game Lab" SIGCSE'11 Mar. 9-12, 2011).*
Matthew MacLaurin ("The Design of Kodu: A Tiny Visual Programming Language for Children on the Xbox 360" POPL'11 Jan. 26-28, 2011).*
C Kelleher ("Motivating programming: using storytelling to make computer programming attractive to middle school girls" PhD thesis 2006).*
"Peter System", http://www.gemtree.com/peter.htm.
"Alice", http://www.alice.org/index.php?page=what_is_alice/what_is_alice.
"SGP Balties", http://www.sgpsys.com/en/.
"Magic Words—A Creative Software Toy", http://www.comikit.se/index.en.html.
Kahn, "ToonTalk™—An Animated Programming Environment for Children" Date: Apr. 16, 1996 version, pp. 1-23.
"3D RAD 3.0", http://www.filedudes.com/3D_Rad-download-24691.html.

* cited by examiner

*Primary Examiner* — Jeffrey A Gaffin
*Assistant Examiner* — Lut Wong (57) ABSTRACT

A rule-based programming language may be devised for programming an entity in an environment. Computer systems may therefore be configured to program the entity with at least one rule comprising at least zero language conditions representing an action condition, at least one language verb representing an action, and at least zero language verb parameters representing an action object. The computer system may also be configured to facilitate entry by a user of a rule set according to the rule-based programming language by receiving user selections of language conditions, language verbs, and language verb parameters. By facilitating the programming by users of entities within environments, the computer system may facilitate individuals (such as non-technical individuals, aspiring programmers, and children) in understanding programming concepts, encourage the development of experience with computer programming, and permit the generation of useful computer programs by non-proficient programmers.

20 Claims, 7 Drawing Sheets

RULE-BASED PROGRAMMING LANGUAGES FOR ENTITIES IN ENVIRONMENTS

BACKGROUND

Many computing scenarios involve the entry of a computer program by a user according to a programming language. Many such programming languages, such as C, Java, and Perl, are defined according to a sequential paradigm, comprising sequences of instructions organized and executed in a linear manner with conditional, branching, and procedural invocation conditional statements that alter the flow of the computer program. Computer programs organized in this manner in various computing scenarios may therefore give rise to a predictable and consistent programmatic behavior.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Computer programs organized according to a sequential paradigm may be helpful for performing a logical sequence of operations. However, some computing scenarios and programmatic behaviors may be better suited to other programming paradigms, wherein a computer program chooses an action based on a set of conditions. For example, models of human behavior may be more advantageously crafted as a set of human actions that may be taken in view of the current mental and physical state of the human (e.g., if tired, sleep; if hungry, locate and eat food; etc.), rather than as a current operation in a long sequence of operations to be performed by the human. Therefore, a programming language applied to such a model of human behavior may comprise not a sequence of instructions, but a set of statefulness tests to be evaluated against the current state of the human (e.g., a current emotion) and executed in view thereof, e.g., to achieve a transition to a more desirable state.

One computing scenario that may benefit from a rule-based programming language is a configuration of an entity in an environment, such as a virtual three-dimensional graphical environment having one or more three-dimensional entities that interact with each other and the other objects of the environment. An environment of this nature may be developed to facilitate an exploration of the interactions of the entities according to the rules by which the entities are programmed. This scenario may be advantageous for providing training in the development of critical thinking skills with regard to some aspects of computer programming, such as statefulness and conditional testing, that may be applicable to more complex programming languages, such as sequential paradigm programming languages that include such concepts. Moreover, these environments may provide training in these computer programming concepts without involving more complicated concepts, such as sequential program flow and variable types and instances. The simplified computer programming environment, based on the concept of one or more entities programmed with rules that may be selected based on a current state of the entity, may therefore be advantageous in exposing individuals (e.g., young children) to computer programming concepts in a familiar context while avoiding the often complicated abstractions of sequential paradigm programming languages.

Therefore, a technique may be devised to facilitate the programming of an entity in an environment with a rule set specified according to a rule-based programming language. The rule-based programming language may comprise at least one language condition, at least one language verb, and at least one language verb parameter (e.g., "if [entity is hungry], [eat] [food].") The technique involves receiving at least one rule comprising at least zero language conditions representing an action condition, at least one language verb representing an action, and at least zero language verb parameters representing an action object, and then programming the entity to perform the rules having satisfied action conditions within the environment. The entity thus configured may perform the rules of the rule set with respect to the current state of the entity and the environment occupied thereby, and continued experimentation with the rule-based programmatic configuration of the entity may be helpful in training individuals in some aspects of computer programming.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Programming languages are often devised for various computing contexts to achieve various ends, such as generating a new program, controlling hardware, or modeling a behavior of an entity in a simulation or a real-world environment. Such programming languages may have many advanced features for achieving complex functionality, such as synchronization operations for multithreaded cooperative access to an area of memory, event raising and handling through event-handling delegates, exception throwing and catching, and object-oriented polymorphism. Advanced programmers who are adept at writing and understanding the nuances of these languages may therefore achieve complex programming behaviors.

However, the complexity of the feature set of many programming languages may be a cognitive hindrance to unskilled programmers, such as aspiring but inexperienced programmers, non-technical individuals, and children. Such individuals may wish to participate in computing scenarios that involve reading and writing programs, but may not be familiar with common programming concepts, such as subroutines, recursion, and object usage. Even the sequential paradigm of many programming languages may cause cognitive problems, due to the length of some programs and potentially intricate nesting of function invocations. These complexities of many programming languages may therefore obstruct an understanding of the programming language by many individuals and discourage or diminish their capability of creating programs in the programming language.

An alternative programming language may be devised that reduces some of the obstacles to understanding the embodied programming concepts. For example, the alternative programming language may replace the sequential paradigm with a stateful paradigm, and may replace the use of abstract variables with more familiar concepts, such as properties of an environment. The alternative programming language may therefore comprise a rule-based programming language for programming an entity in an environment. The environment might comprise a two- or three-dimensional virtual graphical environment in which the entity visibly interacts with other entities and aspects of the environment, or a real-world environment in which an entity (such as an automaton) is to be configured for operation. The behavior of the entity may be specified according to simple rules, such as "if the weather includes rain, open the umbrella" and "if I am hungry and I am carrying an apple, eat the apple." The rules may also be organized into rule groups that may represent (e.g.) different states of the entity, such as a "hungry" state that has rules for finding food and a "tired" state that has rules for resting, and/or different objectives, such as a "locate friendly entity" objective that has rules for seeking and finding a friendly entity and a "play game" objective that has rules for playing a particular game within the environment. Because these concepts may be more familiar to unskilled programmers, the programming language may more easily relate some programming concepts to the non-programmer, and may promote programming by such individuals that leads to the creation of useful software and the development of programming skills. Therefore, a rule-based programming language for programming an entity in an environment may be useful for illustrating programming concepts, training aspiring programmers, and/or permitting the authoring of computer programs that may be useful for experimental purposes or for real-world applications with which automatons in a real-world environment may be programmed.

Figure 1:
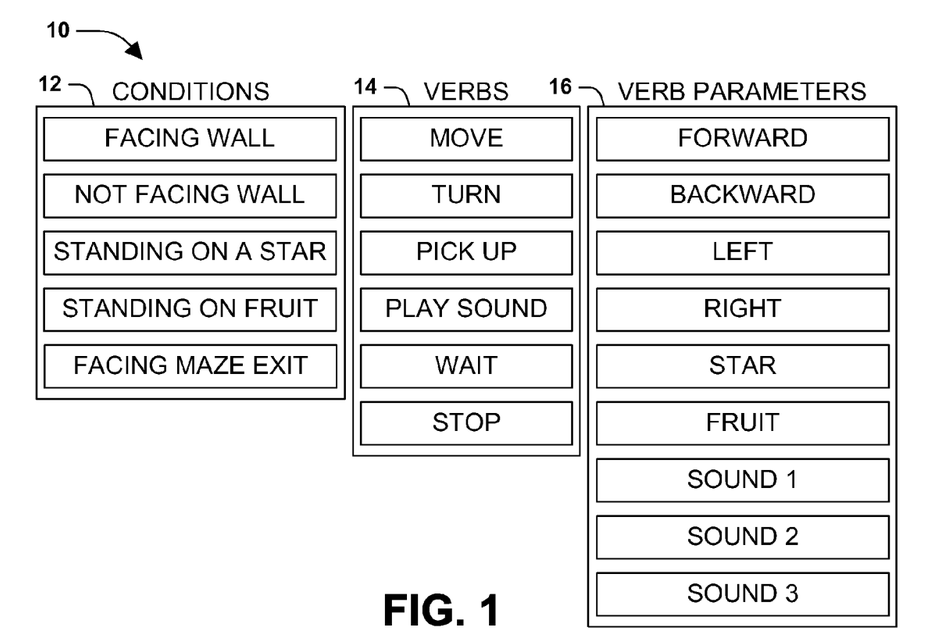
FIG. 1 is an exemplary set of language conditions, language verbs, and language verb parameters comprising an exemplary rule-based programming language.

FIG. 1 illustrates a portion of an exemplary rule-based programming language 10, comprising a set of language conditions 12, a set of language verbs 14, and a set of language verb parameters 16. It may be appreciated that the components of the programming language may not precisely conform with the uses of the parts of speech in English or any other language. For example, some language verb parameters may comprise terms that are nouns (e.g., "tree"), while others may comprise other parts of speech (e.g., "forward.") Terms such as "language verb parameter" and "language verb," as used herein, denote various types of components of the rule-based programming language. For instance, "language verb" generally denotes an action, but may also include, e.g., inactions such as WAIT. Similarly, "language verb parameter" generally denotes an object that may be combined with a language verb to define an action.

Figure 2:
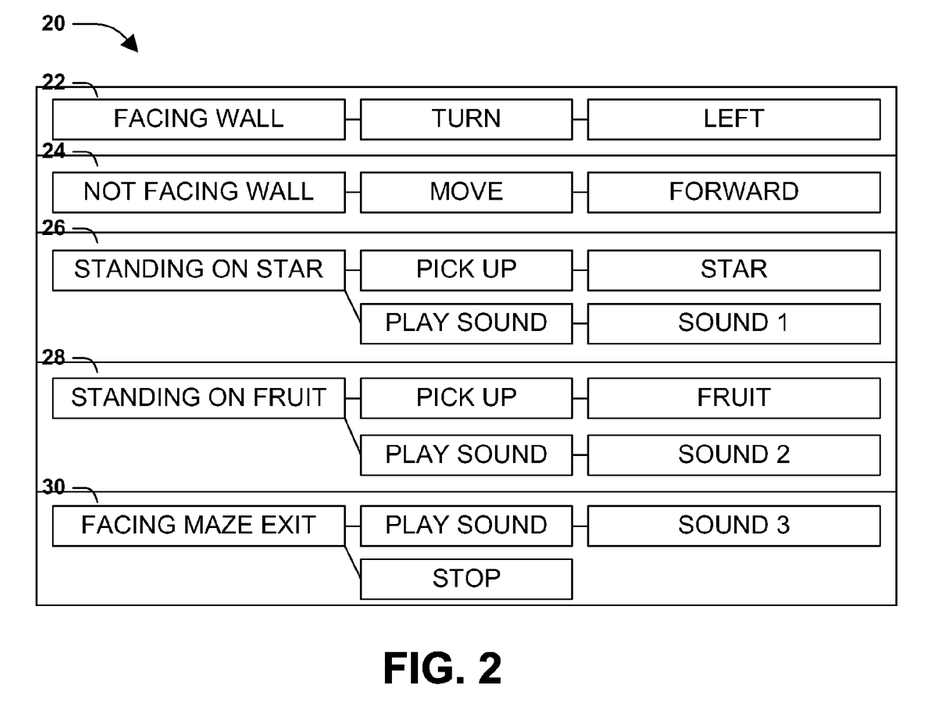
FIG. 2 is an exemplary rule set based on the exemplary rule-based programming language illustrated in FIG. 1.

The exemplary rule-based programming language 10 illustrated in FIG. 1 may be used to specify a computer program useful for controlling an entity placed in an environment comprising a maze, with the objectives of locating the exit of the maze while picking up some items along the way, such as fruit and stars. FIG. 2 illustrates an exemplary computer program 20 devised from the exemplary rule-based programming language 10 of FIG. 1, comprising a set of set of rules comprising at least zero language conditions, at least one language verb, and at least one language verb parameter. For example, a first rule 22 of the exemplary computer program 20 comprises a language condition of "facing wall," specifying whether or not the entity is currently facing a wall of the maze; a language verb of "turn," specifying that the entity should turn; and a language verb parameter of "left," specifying the direction to the left of the entity. These elements therefore specify a rule that an action ("turn") should be performed with respect to an action object ("left") if the action condition ("facing wall") is satisfied. Additional rules are provided for specifying similar actions and action conditions; e.g., an action condition of "standing on star" (evaluating whether or not the entity is located in the same position as a star object) should invoke the action "pick up" with respect to the action object "star," and should invoke the action "play sound" with respect to the action object "sound 1" (e.g., a "scoring" tone indicating that the entity has collected a star that conveys a point score.) Together, the rules of the exemplary rule-based computer program 20 may guide an entity through a maze while collecting items, according to some simple conditions and some actions to be performed for satisfied action conditions.

Figure 3:
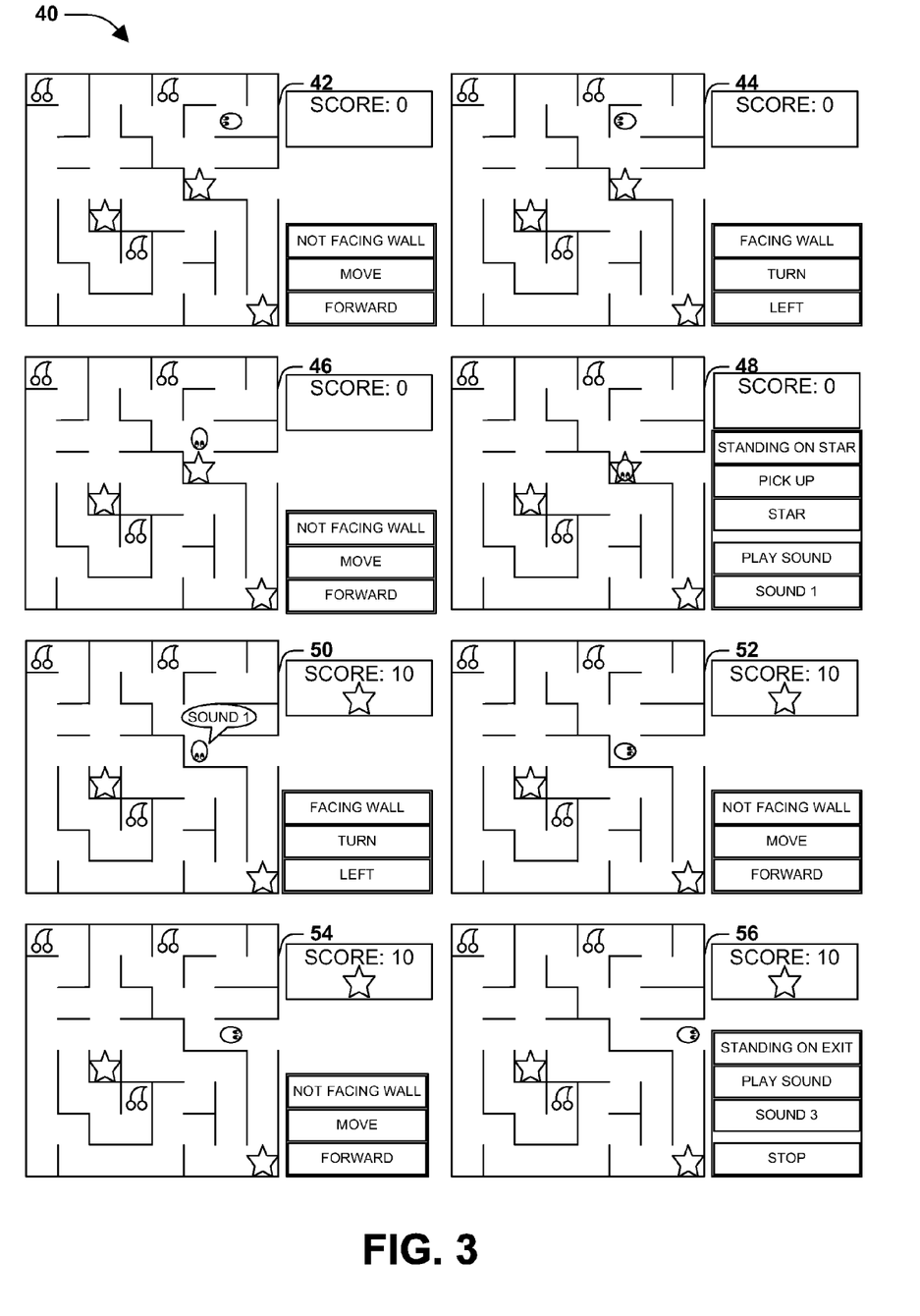
FIG. 3 is an exemplary application of the exemplary rule set illustrated in FIG. 2 to an exemplary environment.

FIG. 3 illustrates an exemplary application 40 of the exemplary computer program 20 of FIG. 2 to program an entity to navigate through an environment comprising a maze. The exemplary application 40 of FIG. 3 comprises a sequence of eight environment states, each environment state depicting the entity at a location in the environment, and wherein the rules comprising the exemplary computer program 20 of FIG. 2 are evaluated to choose an action to be applied to the current environment state in order to reach the next environment state. In the first environment state 42, the entity is in a starting position where it is not facing a wall. The rules of the exemplary computer program 20 are evaluated, and the second rule 24, which has a condition specifying that the entity is not facing a wall, is found to be satisfied. Accordingly, the entity moves forward one square, leading to the second environment state 44, where the entity is now facing a wall. In this state, the entity again evaluates the rules of the exemplary computer program 20, and finds the first rule 22 specifying a condition that the entity is facing a wall is now satisfied. Accordingly, the entity turns to the left, leading to the third environment state 46. In this manner, the exemplary application 40 of FIG. 3 illustrates the entity successively navigating the maze of the environment (and even collecting a star in the fifth environment state) through the use of the exemplary computer program 20 of FIG. 2. The processes by which the entity achieves the navigation of the maze may be more easily understood by non-programmers than a rigorous program specified in a sequential paradigm programming language, which may involve more complicated syntax, function invocations, subroutines, etc.

Figure 4:
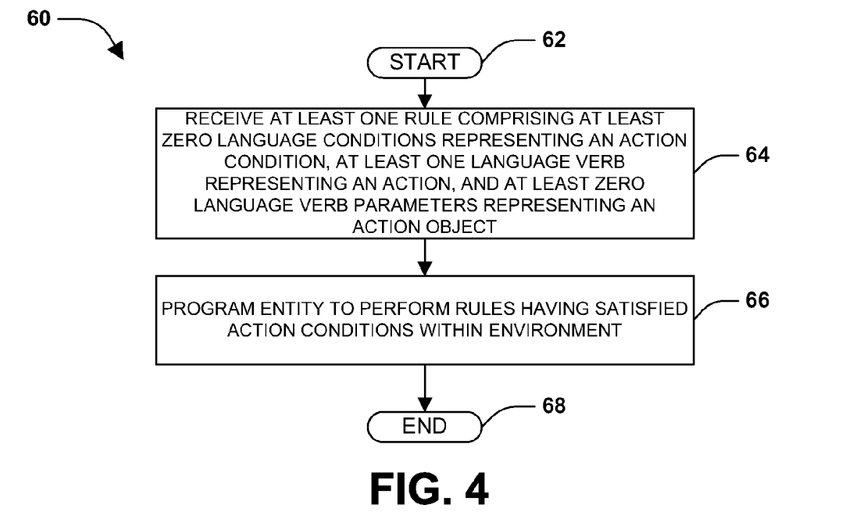
FIG. 4 is a flow diagram illustrating an exemplary method of programming an entity in an environment with a rule set specified according to a rule-based programming language.

In accordance with the foregoing examples, FIG. 4 illustrates an embodiment of these techniques, embodied as an exemplary method 60 of programming an entity in an environment with a rule set specified according to a rule-based programming language. The rule-based programming language comprises at least one language condition, at least one language verb, and at least one language verb parameter, from which rules may be constructed. The exemplary method 60 begins at 62 and involves receiving 64 at least one rule comprising at least zero language conditions representing an action condition, at least one language verb representing an action, and at least zero language verb parameters representing an action object. The exemplary method 60 also involves programming 66 the entity to perform the rules having satisfied action conditions within the environment. Having programmed the entity for operation within the environment with the received computer program specified in the rule-based programming, the exemplary method 62 thereby achieves the programming of the entity, and so ends at 68.

The techniques described herein may also be embodied as a method of facilitating the entry by a user of a rule set (such as the exemplary rule set 20 of FIG. 2) specified according to a rule-based programming language (such as the exemplary rule-based programming language 10 of FIG. 1), which may be used to program an entity in an environment (such as illustrated in the exemplary application 40 of FIG. 3.) The method of facilitating the entry of the computer program may be embodied, e.g., as a user interface that solicits the user for the selection of language conditions, language verbs, and language verb parameters that together comprise a rule; and when the user signals the completion of the computer program, the method may save the entered instructions as a rule set comprising a computer program with which an entity in an environment may be programmed.

Figure 5:
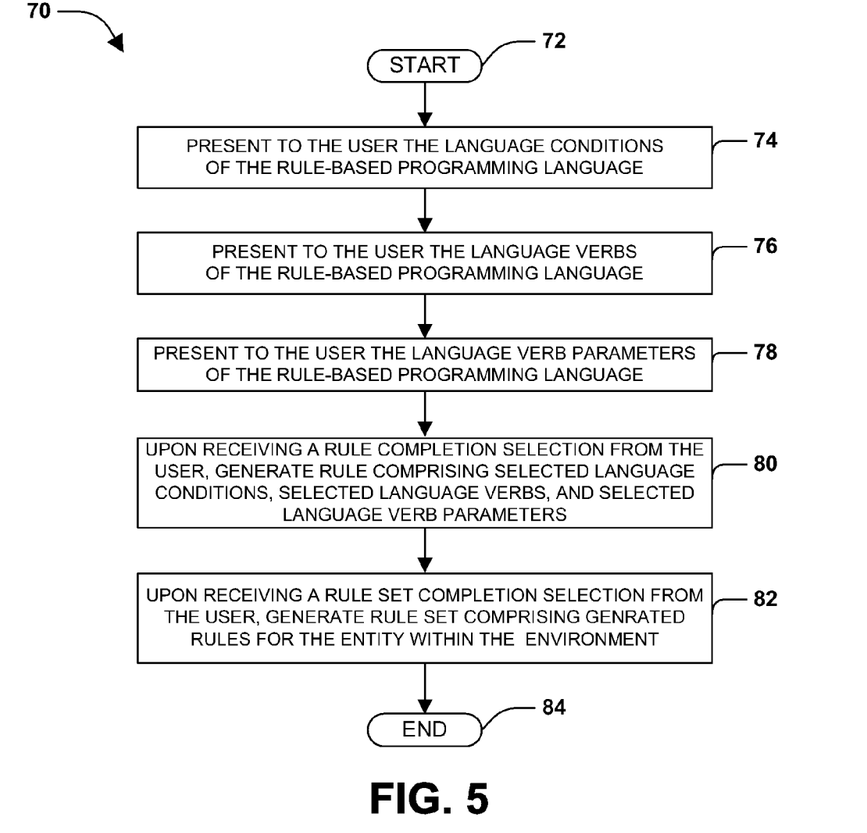
FIG. 5 is a flow diagram illustrating an exemplary method of facilitating entry by a user of a rule set comprising at least one rule specified according to a rule-based programming language for programming an entity in an environment.

FIG. 5 illustrated an exemplary method 70 of facilitating entry by a user of a rule set comprising at least one rule specified according to a rule-based programming language, which may be used to program an entity in an environment. Again, the rule-based programming language may comprise at least one language condition, at least one language verb, and at least one language verb parameter. The exemplary method 70 begins at 72 and involves presenting 74 to the user the language conditions of the rule-based programming language. The exemplary method 70 also involves presenting 76 to the user the language verbs of the rule-based programming language. The exemplary method 70 also involves presenting 78 to the user the language verb parameters of the rule-based programming language. Upon receiving a rule complete selection from the user, the exemplary method 70 also involves generating 80 a rule comprising at least zero selected language conditions representing an action condition, at least one selected language verb representing an action, and at least zero selected language verb parameters representing an action object. And upon receiving a rule set complete selection from the user, the exemplary method 70 involves generating 82 the rule set comprising the generated rules for the entity within the environment. Having prompted the user with the language conditions, language verb parameters, and language verbs of the rule-based programming language, and having generated a rule set comprising rules assembled from the selection of the language conditions, language verbs, and language verb parameters of the programming language, the exemplary method 70 therefore facilitates the entry of a rule set for use in programming an entry in an environment, and so ends at 84.

The techniques presented above may vary in many aspects, and some variations may present additional advantages and/or reduce disadvantages with respect to other variations of these and other techniques. Such variations may be included in various embodiments such as the exemplary method 60 of FIG. 4 and the exemplary method 70 of FIG. 5, to achieve various ends. Such variations may also be compatible with other variations of the aspect and other aspects.

A first aspect that may vary among implementations of these techniques relates to the manner of programming the entity with the computer program specified according to the rule-based programming language. As one example, the entity may be programmed according to a rule cycle, wherein the entity chooses a rule and performs the action, and then waits for other entities to choose a rule and perform an action based on other computer programs before choosing and performing a second rule. This configuration may be advantageous for allowing each entity in the environment to perform one action per turn, thereby synchronizing the activities of the entities. For example, the programming of an entity may involve programming the entity, each rule cycle, to evaluate the action conditions of respective rules within the environment to identify a satisfied rule having satisfied action conditions, and upon identifying a satisfied rule, to perform the satisfied rule within the environment. As a further refinement of this embodiment, upon failing to identify a satisfied rule, the entity may be programmed to remain idle for the rule cycle. As a contrasting example, an asynchronous environment may be provided, wherein an entity may be allowed to evaluate the rules of its programming language and perform the actions thereof without respect to the processing and actions of other entities in the environment. Those of ordinary skill in the art may be able to devise many ways of programming an entity to evaluate the rules of such computer programs and to perform the rules thereof while implementing the techniques discussed herein.

A second aspect that may vary among implementations of these techniques relates to a grouping of rules, which may be applied to provide distinct rule sets for various states of the entity (such as a first rule set applied when the entity is "hungry," a second rule set applied when the entity is "thirsty," a third rule set applied when the entity is "tired," and a fourth rule set applied when the entity is "OK") and/or to control the entity in furtherance of various objectives (such as a first rule set applied when the entity is looking for a star, a second rule set applied when the entity is seeking a friendly entity, and a second rule set applied when the entity is playing a particular game within the environment.) The entity may additionally comprise a rule group identifier, which indicates the rule group that the entity is currently configured to process. The evaluating may therefore comprise evaluating the action conditions of respective rules of the rule group identified by the rule group identifier within the environment to identify a satisfied rule having satisfied action conditions. Moreover, in some such variation, the rule-based programming language may include a capacity for transitioning from one rule group to another, such as to indicate a state change in the entity (e.g., from "hungry" to "OK.") For example, the language verbs of the rule-based programming language may include a language verb representing a rule group transition action, and the language verb parameters may include the rule group names. A computer program specified according to the rule-based programming language may therefore include a rule having an action that represents a rule group transition to a specified rule group. As a further refinement, at least one rule group designated as a start rule group for the entity, and the entity may be programmed, upon initialization of the entity, to set the rule group identifier to one of the start rule groups. This refinement may prevent the entity from beginning in a rule group for an objective that may not be initially relevant (e.g., beginning in the "play checkers" rule group when the entity is not near a friendly entity.)

Figure 6:
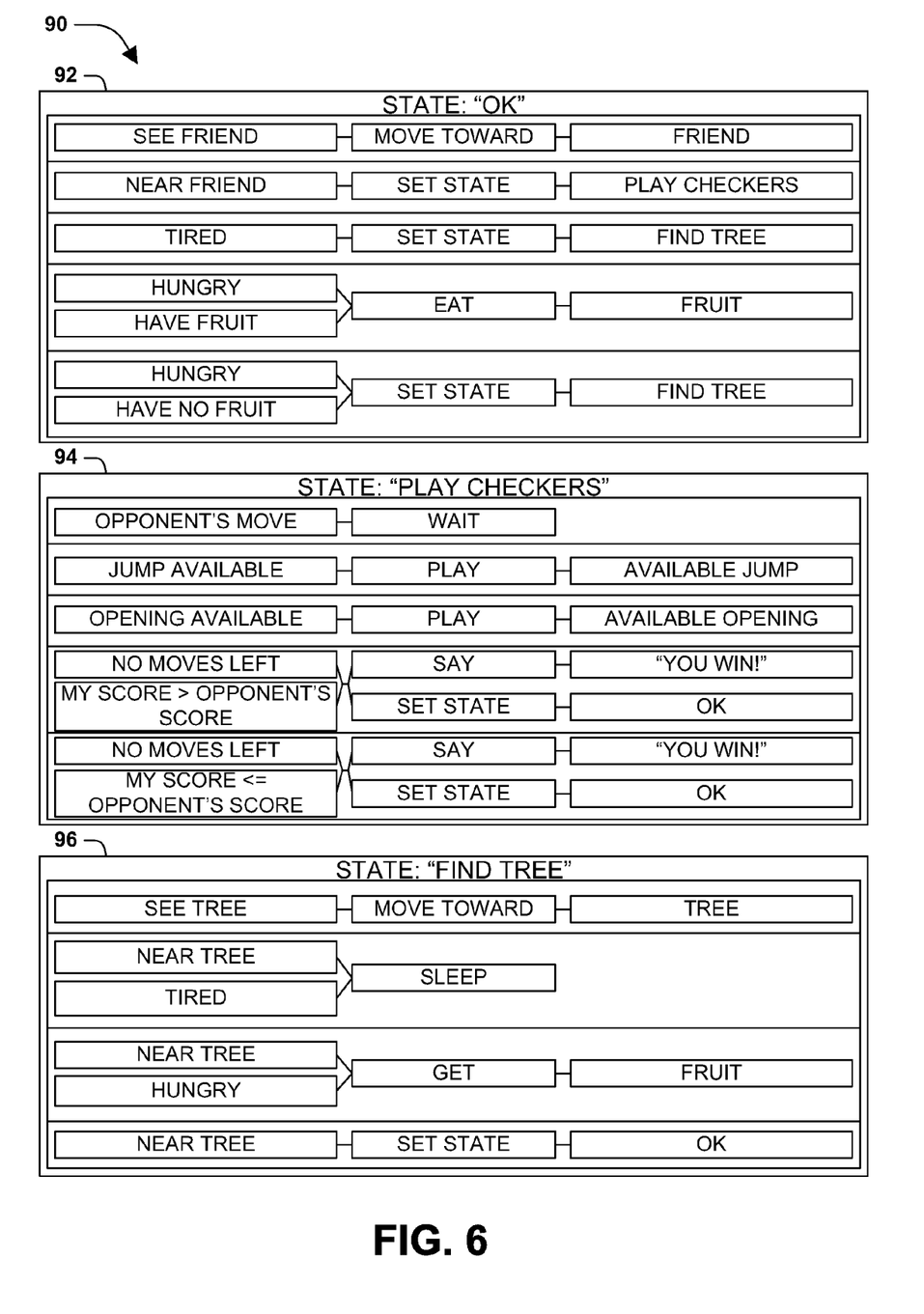
FIG. 6 is an exemplary rule set of an exemplary rule-based programming language comprising rule groups.

FIG. 6 illustrates an exemplary computer program 90 for programming an entity in an environment, comprising rule sets grouped according to various objectives that may be pursued by the entity. When the entity is OK—i.e., when the entity does not have an objective—the entity operates according to an "OK" rule group 92, which configures the entity to seek a friendly entity if the entity can see a friendly entity in the environment, and to eat fruit if the entity is hungry and has fruit. However, if the entity is near a friendly entity, the entity may choose to play checkers with the friendly entity by transitioning to a second rule state 94; and if the entity is tired, or if the entity is hungry but has no fruit, the entity may seek a tree by transitioning to a third rule state 96. These objectives are specified in the distinct rule groups, and the achievement of an objective in either rule group includes a rule group transition action that returns the entity to the "OK" rule group 92. In this manner, the entity may achieve more sophisticated behavior based on objectives, and without resorting to the complexities of a sequential paradigm programming language.

A third aspect that may vary among implementations of these techniques relates to the manner of evaluating the rules (either of an entire computer program, or of a rule set) in order to identify a satisfied rule. As one variation, the rules may simply be evaluated arbitrarily, i.e., where the entity randomly chooses any rule and evaluates it; and upon identifying a satisfied rule, the entity may choose to perform the action associated therewith. Because the rules of a rule-based programming language are not accorded the sequential ordering of a sequential paradigm programming language, the rules are not necessarily to be evaluated in a particular order. For example, the rules may be chosen for evaluation in an arbitrary (e.g., random) manner, and two entities operating the same computer program and present in the same circumstances of the environment may choose different behaviors. For instance, if an entity is concurrently tired and hungry, then rules with "hungry" and "tired" conditions may be concurrently satisfied, and a first entity may choose the first rule relating to the "hungry" condition while a second entity may choose the second rule relating to the "tired" condition. This variation may present an advantage of programming the entities to exhibit more organic behavior than automatically determined behavior, such as may often be exhibited by sequential paradigm programming languages.

Another variation of the third aspect relates to the prioritization of rules. While the rules of the rule-based programming language are not placed in the strictly sequential ordering of a sequential paradigm programming language, some rules may nevertheless be prioritized with respect to other rules. Accordingly, in one such example, respective rules comprising a rule priority, and the evaluating may comprise evaluating the action conditions of respective rules in descending priority order within the environment to identify a satisfied rule having satisfied action conditions. For instance, in the "OK" rule set 92 in the exemplary computer program 90 of FIG. 6, the "tired" rule may be assigned a priority above the other rules of the "OK" rule set 92, such that the entity is programmed first to satisfy the "tired" condition when it arises, and then to choose among the other conditions in the rule set that have the same priority. Conversely, the "see friendly entity" and "near friendly entity" rules may be assigned a lower priority than the other rules, such that more significant conditions (the "tired" condition and the "hungry" condition) are evaluated before less significant conditions.

Another exemplary prioritization of rules involves an evaluation of all of the rules of the rule set to determine the rules that are satisfied before selecting a satisfied rule to perform. Such evaluation may be performed in series or in parallel, and may involve an evaluation of all rules of the rule set, all rules having a certain priority or range of priorities, the rules of a rule group within the rule set, etc. If more than one evaluated rule is satisfied, the computer system may be configured to choose among the rules to perform in any manner. For instance, the computer system may choose a rule at random, a rule that was most or least recently performed, or a rule relating to the most proximate object in the environment. Alternatively or additionally, a plurality of satisfied rules may be performed concurrently. For example, an entity may have a satisfied rule of "if hungry, move toward tree" and also a satisfied rule of "if see friendly entity, move toward friendly entity." The entity may be programmed to choose between such rules, or, if permitted by the environment, may perform both rules, thereby moving toward both the tree and the friendly entity. Alternatively or additionally, the entity may be programmed to choose rules of various action types (e.g., one "move" rule and one "say" rule), and may choose satisfied rules of various action types to perform multiple compatible actions at once. Those of ordinary skill in the art may devise many ways of programming the entity to choose among a plurality of satisfied rules while implementing the techniques discussed herein.

A fourth aspect that may vary among implementations relates to some additional features that may be included in the programming language, and that may be incorporated in computer programs specified according to such rule-based programming languages. As one example, the programming language may comprise at least one Boolean logic connector, and the rules may comprise at least two action conditions joined by a Boolean logic connector. The evaluation of a rule may therefore comprise evaluating the action conditions of the rule according to the Boolean logic connector to identify a satisfied rule having satisfied action conditions according to the Boolean logic connector. For instance, a first rule may specify that all of three conditions are to be concurrently satisfied (e.g., "tired," "near tree," and "nighttime") in order to satisfy the rule and perform the action (e.g., "rest"), while a second rule may specify that any of three conditions may be satisfied (e.g., "have apple," "have orange," or "have plum") in order to satisfy the rule and perform the action (e.g., "eat food.") Such Boolean connectors may also be nested (e.g., "hungry and (have apple or have plum)" in order to represent more nuanced rules.

As a second example, the entity in the environment may be configured to accept input from an external source, such as a user (e.g., through a computer peripheral, such as a game controller) or another computer program. The language conditions may therefore comprise at least one entity controller input condition, such that a rule may be specified with reference to input from the entity controller (e.g., "if receiving 'up' entity controller input, move north.") Such entity controller input conditions may be combined with other conditions (e.g., "if holding apple and receiving 'up' entity controller input, eat apple.")

As a third example, at least one language condition comprising an environment test, which may be evaluated in the context of the entity within the environment. The environment test may involve (e.g.) a test of a sensory condition, such as an entity type condition (e.g., "the entity is a turtle"), an entity status condition (e.g., "the entity is hungry"), an entity possessory condition (e.g., "the entity has an apple"), an entity sensory input condition (e.g., "the entity sees an apple"), an environment status condition ("the time of day is nighttime"), etc. The sensory condition may be specified in isolation (e.g., "it is raining") or with respect to an object, such as a language verb parameter (e.g., "see tree" vs. "see apple.") The evaluating therefore comprises evaluating the sensory condition for the sensory object of the rule within the environment to identify a satisfied rule having a satisfied sensory condition for the sensory object within the environment.

As a first refinement of the third example, the language verb parameters may comprise a sensory object reference that represents the sensory object of the language condition of the rule (e.g., "if the entity sees an apple or sees a plum, eat [it].") This refinement may facilitate the application of a rule to more than one condition, which may therefore reduce redundant rule input.

As a second refinement of the third example, the rule-based programming language may also comprise at least one language adjective, which may refer to a property of the sensory object referenced in a sensory condition. For instance, objects in the environment may comprise various properties, such as color, shape, size, and texture, and the rule-based programming language may permit the specification of rules targeting only certain kinds of objects having certain properties. According to this refinement, an environment test may comprise a condition representing a sensory condition, a language verb parameter representing a sensory object, and a language adjective representing a sensory object adjective; and the evaluating of the rule may comprise evaluating the sensory condition for the sensory object of the rule modified by the sensory object adjective within the environment to identify a satisfied rule having a satisfied sensory condition for the sensory object modified by the sensory object adjective within the environment. For instance, in the exemplary application 40 of FIG. 3, the stars in the maze may have different colors (red, green, and blue), and the entity may be programmed only to pick up blue stars. Accordingly, the computer program with which the entity is programmed may include a rule having a sensory condition "if standing on a blue star, pick up the star," in order to configure the entity not to pick up the red or green stars. Moreover, the inclusion of adjectives may permit rules to specify any object having a certain property, such as any "red object," which might include red stars, red fruit, and even other entities that are red. Other variations and additional features may be devised for the rule-based programming language by those of ordinary skill in the art while implementing the techniques discussed herein.

A fifth aspect that may vary among implementations relates to the manner of accepting the computer program, such as from a user according to the method 70 of FIG. 5. The computer system may provide an integrated development environment that serves as a user interface for creating computer programs based on the rule-based programming language. Such computer programs may be created and stored, such as to a file server, and may later be retrieved for programming an entity within an environment; or the computer program so created may, upon completion, be promptly used to program a newly created entity in an environment; or the computer program; or the computer program may be used to program an entity that already exists within an environment. In one such variation, the computer program may be stored on a computer program server that holds many computer programs created by many programmers for programming various entities within various environments.

With respect to some of the variations of the rule-based programming language, the user interface for facilitating the entry of computer programs may be customized in various ways. As a first example, the computer program may be generated for an entity type, which may comprise a set of actions represented by some (but not all) of the language verbs of the computer-based programming language. While entering the computer program, the user may specify the entity type with which the computer program is to be compatible. A user interface configured to permit such specification of the entity targeted by the computer program may adapt to present to the user only the language verbs that are compatible with the specified entity type. Alternatively or additionally, an entity type may comprise only some of the available sensory inputs (e.g., a snail may not have a "hear" capability), and the sensory conditions presented to the user for programming the entity type may be limited to present only the sensory conditions that are compatible with the specified entity type. In this manner, the user interface may reduce errors produced by the script involving a specification of a language verb that the targeted entity type cannot perform. As a second example, if the rule-based programming language permits rules to be organized into rule groups with rule group names, the user interface may be configured to receive the rule group names from the user upon defining a new rule group, and to generate the rule set for the entity within the environment where the rules are grouped according to the rule groups. Moreover, where the programming language includes the capability of transitioning to a new rule group, such as where the language verbs may comprise a rule group transition action and the language verb parameters comprise the rule group names, the user interface may be configured to display these options for the user in order to facilitate the entry of the computer program.

As a third example, the user interface may be configured to reduce or prevent the entry of syntax errors that violate the semantics of the rule-based programming language. The user interface may initially present to the user all of the language conditions, language verb parameters, and language verbs, and may await selection of one such language part representing the specification of part of a new rule. Upon receiving a selection, the user interface may then remove the language conditions, language verb parameters, and language verbs that are not grammatically compatible with the selected language part, or that may be compatible but are logically incompatible (e.g., "when facing a wall and when not facing a wall."), or that are simply uncommon. As one variation of this third example, if the language conditions include an environment test comprising a language condition representing a sensory condition and a language verb parameter representing a sensory object, the user interface may be configured to present to the user the language verb parameters of the rule-based programming language that are grammatically compatible with a selected language condition. For instance, if the user selects "see" to denote a sensory condition applying to visible objects, then the user interface may limit the language verb parameters presented to the user as sensory objects to objects that are visible. As another variation of this example, upon receiving a selection of a language verb, the user interface may limit the language verb parameters presented to the user as action objects to those that are grammatically compatible with the selected verb (e.g., if "move" is selected, the presented language verb parameters may include only the directions of the rule-based programming language, such as north, south, etc.)

Figure 7:
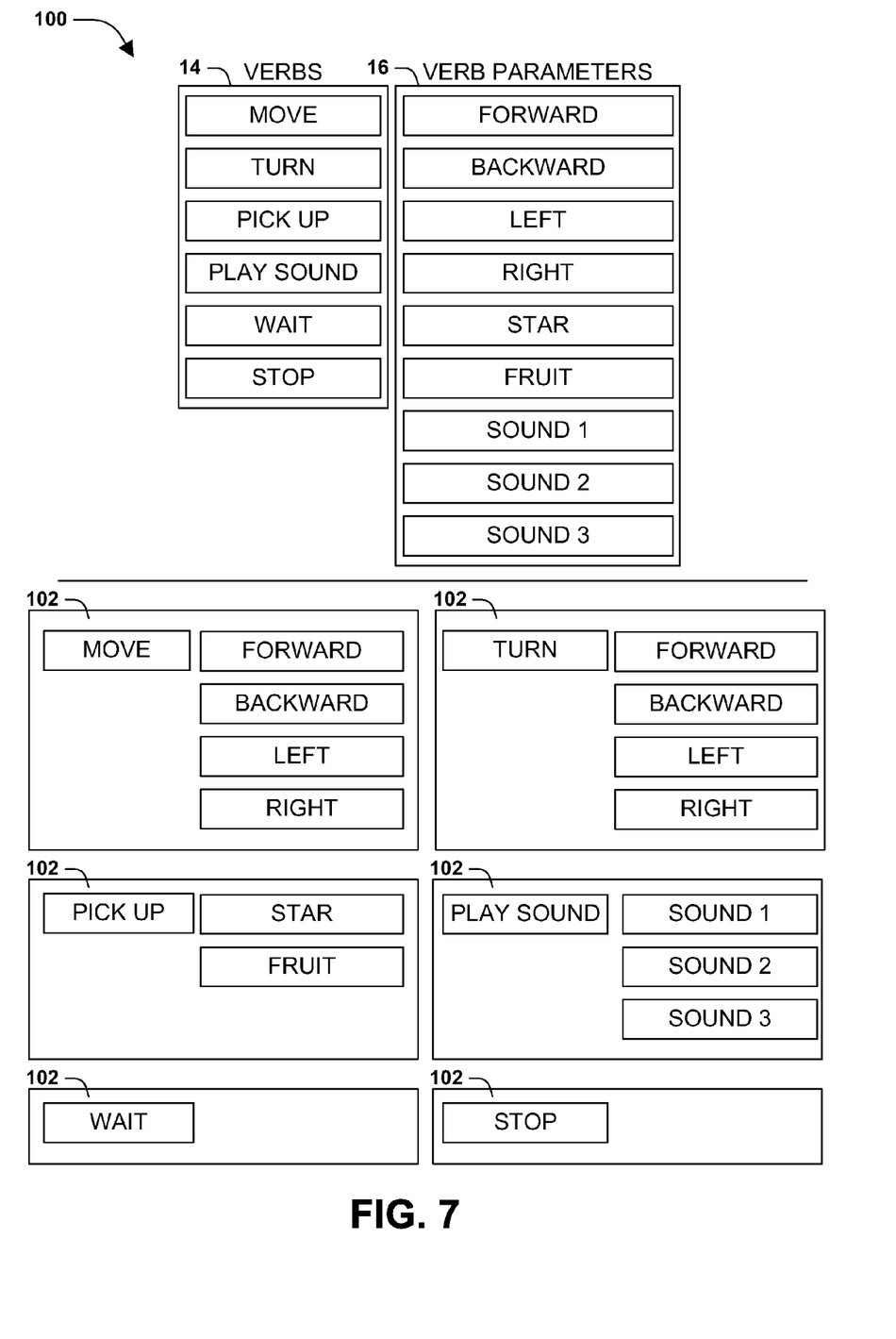
FIG. 7 is an illustration of a set of language verbs and language verb parameters comprising a rule-based programming language, and a set of selected language verbs with a subset of grammatically compatible language verb parameters.

FIG. 7 illustrates one such third example 100, based on the language verbs 14 and the language verb parameters 16 of the exemplary rule-based programming language 10 of FIG. 1. As illustrated in FIG. 7, upon selecting a language verb 14, a language verb parameter subset 102 may be presented to the user limited to the language verb parameters 16 that are grammatically compatible with the selected language verb 14. By configuring the user interface in this manner, the computer system may facilitate the entry of rules that comply with the grammar of the rule-based programming language and with the presumed intentions of the user.

Figure 8:
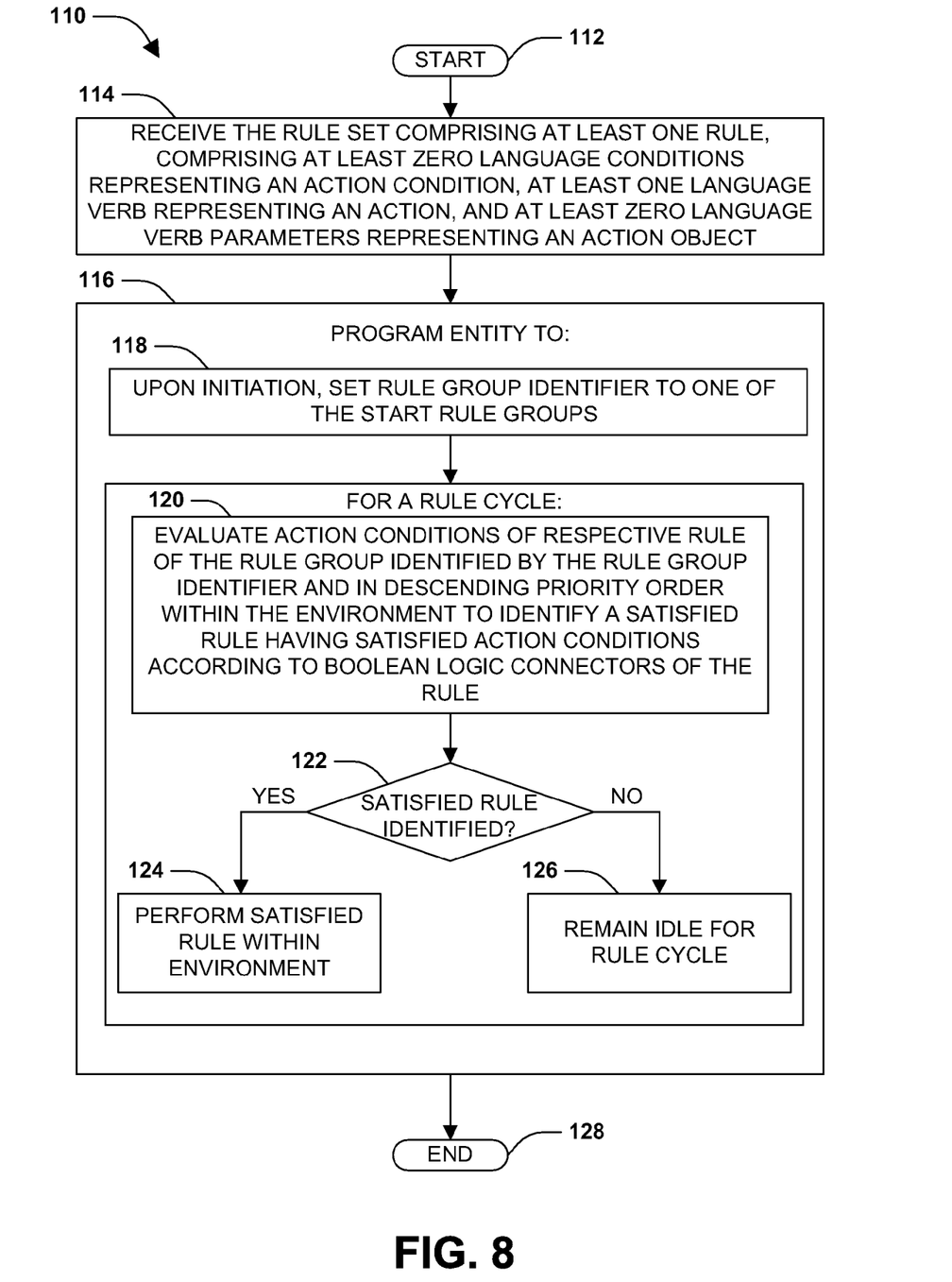
FIG. 8 is a flow diagram illustrating another exemplary method of programming an entity in an environment with a rule set comprising at least one rule.

In view of these aspects and variations thereof, an embodiment may be devised that incorporates several such variations and presents several of the advantages and mitigates several of the disadvantages discussed herein. FIG. 8 illustrates one such embodiment, comprising an exemplary method 110 of programming an entity in an environment with a rule set comprising at least one rule. This exemplary method 110 may be applied within a particular computing environment. First, respective rules are grouped according to at least one rule group having a rule group name, with at least one group designated as a start rule group for the entity. Second, the entity is configured to accept input from an entity controller, e.g., a game controller operated by a user. Third, the exemplary method 110 involves a rule-based programming language that comprises various language conditions, including at least one entity controller input condition, at least one environment test comprising a sensory condition (e.g., an entity type condition, an entity status condition, an entity possessory condition, an entity sensory input condition, and/or an environment status condition), a language verb parameter representing a sensory object, and zero or more language adjectives representing the sensory object. The rule-based programming language also comprises at least one language verb, including at least one rule group transition verb, and at least one language verb parameter, including the rule group names and a sensory object reference representing the sensory object of the language condition of the rule. The rule-based programming language also includes at least one language adjective, and at least one Boolean logic connector. Third, according to this rule-based programming language, respective rules comprise a rule priority, at least one language condition representing an action condition, at least one language verb representing an action, and at least one language verb parameter representing an action object. Also, the entity comprises a rule group identifier that identifies the rule group currently evaluated by the entity.

Within a programming environment of this nature, the exemplary method 110 performs the programming of the entity to operate within the environment in the following manner. The exemplary method 110 begins at 112 and involves receiving 114 the rule set comprising at least one rule. As noted, the rule comprises at least zero language conditions representing an action condition, at least one language verb representing an action and at least zero language verb parameters representing an action object. The exemplary method 110 also involves programming 116 the entity to perform the rule set in the following manner. The exemplary method 110 involves programming the entity to, upon initialization of the entity, set 118 the rule group identifier to one of the start rule groups. The exemplary method 110 also involves programming the entity, per rule cycle, to evaluate 120 the action conditions of respective rules of the rule group identified by the rule group identifier and in descending priority order, within the environment to identify a satisfied rule having satisfied action conditions according to Boolean logic connectors of the rule. If the entity identifies a satisfied rule for the rule cycle, the exemplary method 110 programs the entity to branch at 122 and to perform 124 the satisfied rule within the environment. If the entity fails to identify a satisfied rule, the exemplary method 110 programs entity to branch at 122 and to remain 126 idle for the rule cycle. By receiving the rule set and programming the entity to perform the rule set by evaluating the rules per rule cycle to identify and perform a satisfied rule, the exemplary method 110 thereby achieves the programming of an entity with a rule set specified according to the rule-based programming language, and so ends at 128.

Figure 9:
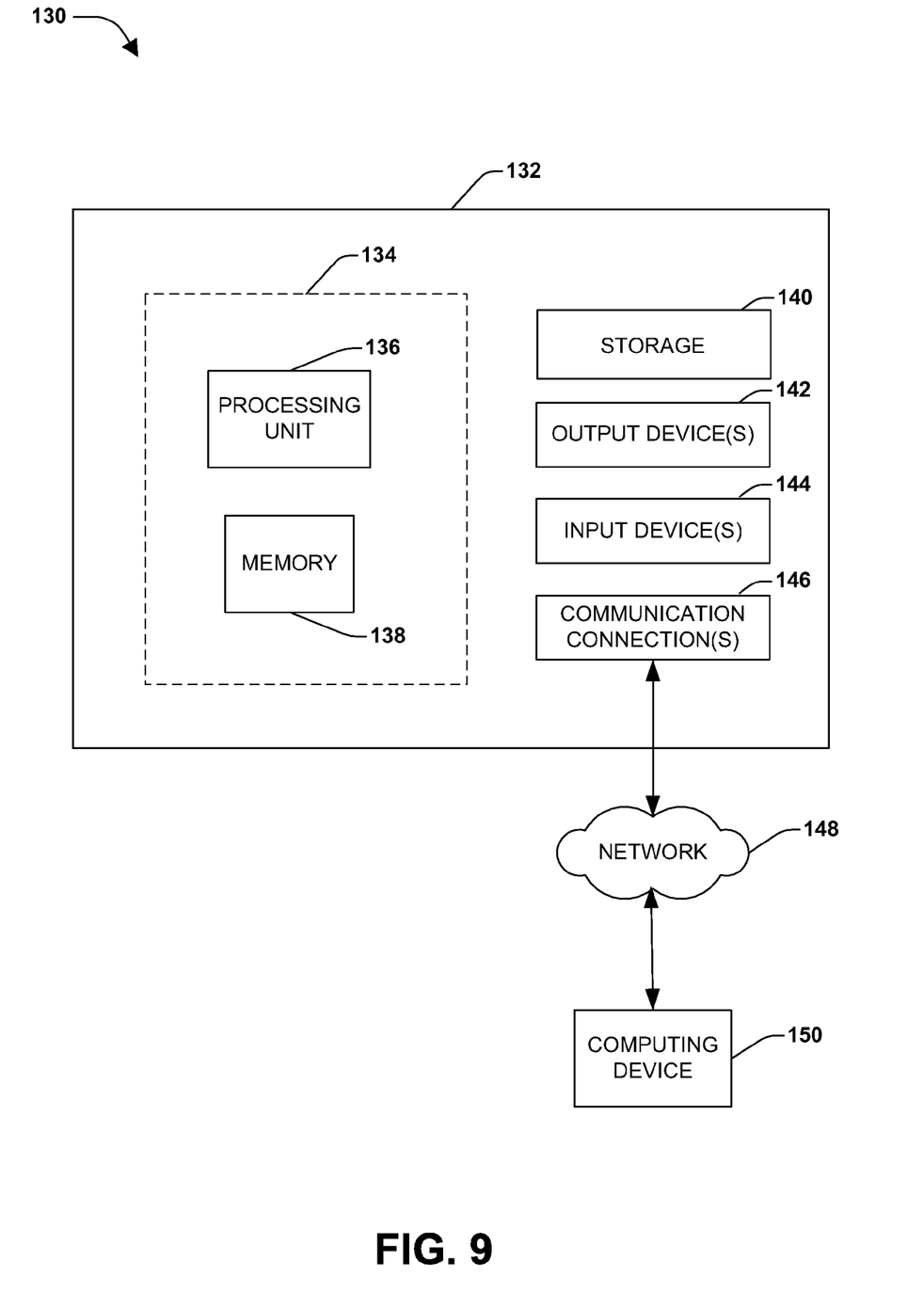
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 9 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 9 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of programming an entity in an environment with a rule set:
respective rules grouped according to at least one rule group having a rule group name;
at least one group designated as a start rule group for the entity;
the entity configured to accept input from an entity controller;
at least one rule specified according to a rule-based programming language comprising:
at least one language condition, comprising:
at least one entity controller input condition; and
at least one environment test comprising:
a sensory condition comprising at least one of:
an entity type condition;
an entity status condition;
an entity possessory condition;
an entity sensory input condition; and
an environment status condition;
a language verb parameter representing a sensory object; and
at least zero language adjectives representing the sensory object;
at least one language verb, comprising at least one rule group transition verb;
at least one language verb parameter, comprising:
names associated with the respective rules; and
a sensory object reference representing the sensory object of the language condition of the at least one rule;
at least one language adjective; and
at least one Boolean logic connector;
the at least one rule comprising a rule priority, at least one language condition representing an action condition, at least one language verb representing an action, and at least one language verb parameter representing an action object;
the entity comprising a rule group identifier;
and the method comprising:
receiving the rule set comprising the at least one rule; and
programming the entity to:
upon initialization of the entity, set the rule group identifier to one of the start rule groups; and
for a rule cycle, to:
evaluate one or more action conditions of respective rules of the one of the start rule groups identified by the rule group identifier and in descending priority order, within the environment to identify a satisfied rule having satisfied action conditions according to Boolean logic connectors of the satisfied rule;
upon identifying a first satisfied rule, perform the first satisfied rule within the environment; and
upon failing to identify a second satisfied rule, remain idle for the rule cycle.

2. The method of claim 1:
at least one rule comprising at least two action conditions joined by a Boolean logic connector.

3. The method of claim 1, comprising evaluating a first sensory condition for a first sensory object of a first rule within a first environment to identify a first satisfied rule having a first satisfied sensory condition for the first sensory object within the first environment.

4. The method of claim 3, comprising evaluating the first sensory condition for the first sensory object of the first rule modified by a first sensory object adjective within the first environment to identify a second satisfied rule having a second satisfied sensory condition for the first sensory object modified by the first sensory object adjective within the first environment.

5. The method of claim 1:
the at least one language verb comprising at least one rule group transition action.

6. The method of claim 1:
the rule group name received from a user.

7. The method of claim 1, at least one language verb parameter of the rule-based programming language presented to a user comprising one or more language verb parameters that are grammatically compatible with a selected language verb.

8. A computer-readable device comprising processor-executable instructions configured to perform a method of programming an entity in an environment with a rule set:
respective rules grouped according to at least one rule group having a rule group name;
at least one group designated as a start rule group for the entity;
the entity configured to accept input from an entity controller;
at least one rule specified according to a rule-based programming language comprising:
at least one language condition, comprising:
at least one entity controller input condition; and
at least one environment test comprising:
a sensory condition comprising at least one of:
an entity type condition;
an entity status condition;
an entity possessory condition;
an entity sensory input condition; and
an environment status condition;
a language verb parameter representing a sensory object; and
at least zero language adjectives representing the sensory object;
at least one language verb, comprising at least one rule group transition verb;
at least one language verb parameter, comprising:
names associated with the respective rules; and
a sensory object reference representing the sensory object of the language condition of the at least one rule;
at least one language adjective; and
at least one Boolean logic connector;
the at least one rule comprising a rule priority, at least one language condition representing an action condition, at least one language verb representing an action, and at least one language verb parameter representing an action object;
the entity comprising a rule group identifier;
and the method comprising:
receiving the rule set comprising the at least one rule; and
programming the entity to:
upon initialization of the entity, set the rule group identifier to one of the start rule groups; and
for a rule cycle, to:
evaluate one or more action conditions of respective rules of the one of the start rule groups identified by the rule group identifier and in descending priority order, within the environment to identify a satisfied rule having satisfied action conditions according to Boolean logic connectors of the satisfied rule;
upon identifying a first satisfied rule, perform the first satisfied rule within the environment; and
upon failing to identify a second satisfied rule, remain idle for the rule cycle.

9. The computer-readable device of claim 8, at least one rule comprising at least two action conditions joined by a Boolean logic connector.

10. The computer-readable device of claim 8, the method comprising evaluating a first sensory condition for a first sensory object of a first rule within a first environment to identify a first satisfied rule having a first satisfied sensory condition for the first sensory object within the first environment.

11. The computer-readable device of claim 10, the method comprising evaluating the first sensory condition for the first sensory object of the first rule modified by a first sensory object adjective within the first environment to identify a second satisfied rule having a second satisfied sensory condition for the first sensory object modified by the first sensory object adjective within the first environment.

12. The computer-readable device of claim 8, the at least one language verb comprising at least one rule group transition action.

13. The computer-readable device of claim 8, the rule group name received from a user.

14. The computer-readable device of claim 8, at least one language verb parameter of the rule-based programming language presented to a user comprising one or more language verb parameters that are grammatically compatible with a selected language verb.

15. A system comprising:
one or more processors;
one or more memory units coupled to at least one of the one or more processors; and
instructions comprised in at least one of the one or more memory units, the instructions, when executed at least in part by at least one of the one or more processors, configured to perform a method of programming an entity in an environment with a rule set:
respective rules grouped according to at least one rule group having a rule group name;
at least one group designated as a start rule group for the entity;
the entity configured to accept input from an entity controller;
at least one rule specified according to a rule-based programming language comprising:
at least one language condition, comprising:
at least one entity controller input condition; and
at least one environment test comprising:
a sensory condition comprising at least one of:
an entity type condition;
an entity status condition;
an entity possessory condition;
an entity sensory input condition; and
an environment status condition;
a language verb parameter representing a sensory object; and
at least zero language adjectives representing the sensory object;
at least one language verb, comprising at least one rule group transition verb;
at least one language verb parameter, comprising:
names associated with the respective rules; and
a sensory object reference representing the sensory object of the language condition of the at least one rule;
at least one language adjective; and
at least one Boolean logic connector;
the at least one rule comprising a rule priority, at least one language condition representing an action condition, at least one language verb representing an action, and at least one language verb parameter representing an action object;
the entity comprising a rule group identifier;
and the method comprising:
receiving the rule set comprising the at least one rule; and
programming the entity to:
upon initialization of the entity, set the rule group identifier to one of the start rule groups; and
for a rule cycle, to:
evaluate one or more action conditions of respective rules of the one of the start rule groups identified by the rule group identifier and in descending priority order, within the environment to identify a satisfied rule having satisfied action conditions according to Boolean logic connectors of the satisfied rule;
upon identifying a first satisfied rule, perform the first satisfied rule within the environment; and
upon failing to identify a second satisfied rule, remain idle for the rule cycle.

16. The system of claim 15, at least one rule comprising at least two action conditions joined by a Boolean logic connector.

17. The system of claim 15, the method comprising evaluating a first sensory condition for a first sensory object of a first rule within a first environment to identify a first satisfied rule having a first satisfied sensory condition for the first sensory object within the first environment.

18. The system of claim 17, the method comprising evaluating the first sensory condition for the first sensory object of the first rule modified by a first sensory object adjective within the first environment to identify a second satisfied rule having a second satisfied sensory condition for the first sensory object modified by the first sensory object adjective within the first environment.

19. The system of claim 15, the at least one language verb comprising at least one rule group transition action.

20. The system of claim 15, at least one language verb parameter of the rule-based programming language presented to a user comprising one or more language verb parameters that are grammatically compatible with a selected language verb.

* * * * *